(12) United States Patent
Baron

(10) Patent No.: US 6,675,526 B1
(45) Date of Patent: Jan. 13, 2004

(54) ARTIFICIAL BAIT FISH

(75) Inventor: Richard D. Baron, Zephyrhills, FL (US)

(73) Assignee: Wanabe Outdoors, Inc., Tampa, FL (US)

( * ) Notice: Subject to any disclaimer, the term of this patent is extended or adjusted under 35 U.S.C. 154(b) by 0 days.

(21) Appl. No.: 10/087,515

(22) Filed: Mar. 1, 2002

Related U.S. Application Data

(60) Provisional application No. 60/274,173, filed on Mar. 8, 2001.

(51) Int. Cl.$^7$ .............................................. A01K 85/00
(52) U.S. Cl. ..................................................... 43/42.36
(58) Field of Search ............................ 43/42.36, 42.08, 43/42.38

(56) References Cited

U.S. PATENT DOCUMENTS

| | | | |
|---|---|---|---|
| 1,615,803 A | | 1/1927 | Pflueger |
| 2,017,333 A | | 11/1935 | Zuck |
| 2,196,376 A | | 4/1940 | Anderson |
| 2,467,971 A | | 4/1949 | Frair |
| 2,605,578 A | * | 8/1952 | Waterton ................... 43/42.05 |
| 2,610,428 A | | 9/1952 | Jones |
| 2,763,086 A | | 9/1956 | Johnson et al. |
| 2,848,836 A | | 8/1958 | Dodd |
| 2,869,278 A | * | 1/1959 | Cook ......................... 43/42.08 |
| 2,871,046 A | * | 1/1959 | Smith ........................ 43/42.08 |
| 3,157,959 A | | 11/1964 | Anderson |
| 3,415,004 A | | 12/1968 | Whalen |
| 3,445,953 A | | 5/1969 | Dailey |
| 3,500,576 A | | 3/1970 | Ostrom |
| 3,521,394 A | * | 7/1970 | Wintersberger ............ 43/42.06 |
| 3,543,434 A | | 12/1970 | Hauk |
| 3,645,031 A | | 2/1972 | Egles |
| 4,067,135 A | | 1/1978 | Martin |
| 4,126,956 A | | 11/1978 | Bayer |
| 4,133,132 A | | 1/1979 | Ellis et al. |
| 4,233,771 A | | 11/1980 | Robinson |
| 4,791,751 A | | 12/1988 | Francklyn |
| 4,796,375 A | * | 1/1989 | Wilson ....................... 43/42.05 |
| 4,796,376 A | | 1/1989 | Schlaegel |
| 4,841,664 A | * | 6/1989 | Baldwin ........................ 43/41 |
| 4,848,023 A | | 7/1989 | Ryder et al. |
| 4,932,154 A | | 6/1990 | Andreetti |
| 4,944,112 A | | 7/1990 | Garmany et al. |
| 5,177,895 A | * | 1/1993 | Baron ......................... 43/44.2 |
| 5,207,016 A | * | 5/1993 | Pate .......................... 43/42.28 |
| 5,456,039 A | * | 10/1995 | Pisoni et al. ................ 43/42.24 |
| 5,505,016 A | | 4/1996 | Baron |
| 5,778,593 A | | 7/1998 | Baron |
| 6,170,191 B1 | * | 1/2001 | Laney ....................... 43/43.13 |

* cited by examiner

*Primary Examiner*—Charles T. Jordan
*Assistant Examiner*—Jordan Lofdahl
(74) *Attorney, Agent, or Firm*—Frijouf, Rust & Pyle, P.A.

(57) ABSTRACT

An improved artificial bait fish is disclosed for use with a fishing hook attached to a fishing line. The improved artificial bait fish comprises a longitudinally extending fish body member formed in a replica of a fish having a head portion, a body portion and a tail portion. A bore extends longitudinally through the fish body member from the head portion toward the tail portion. The bore receives the fishing line therein for positioning the fishing hook relative to the tail portion of the fish body member. The improved artificial bait fish may be used with an artificial fishing lure.

19 Claims, 8 Drawing Sheets

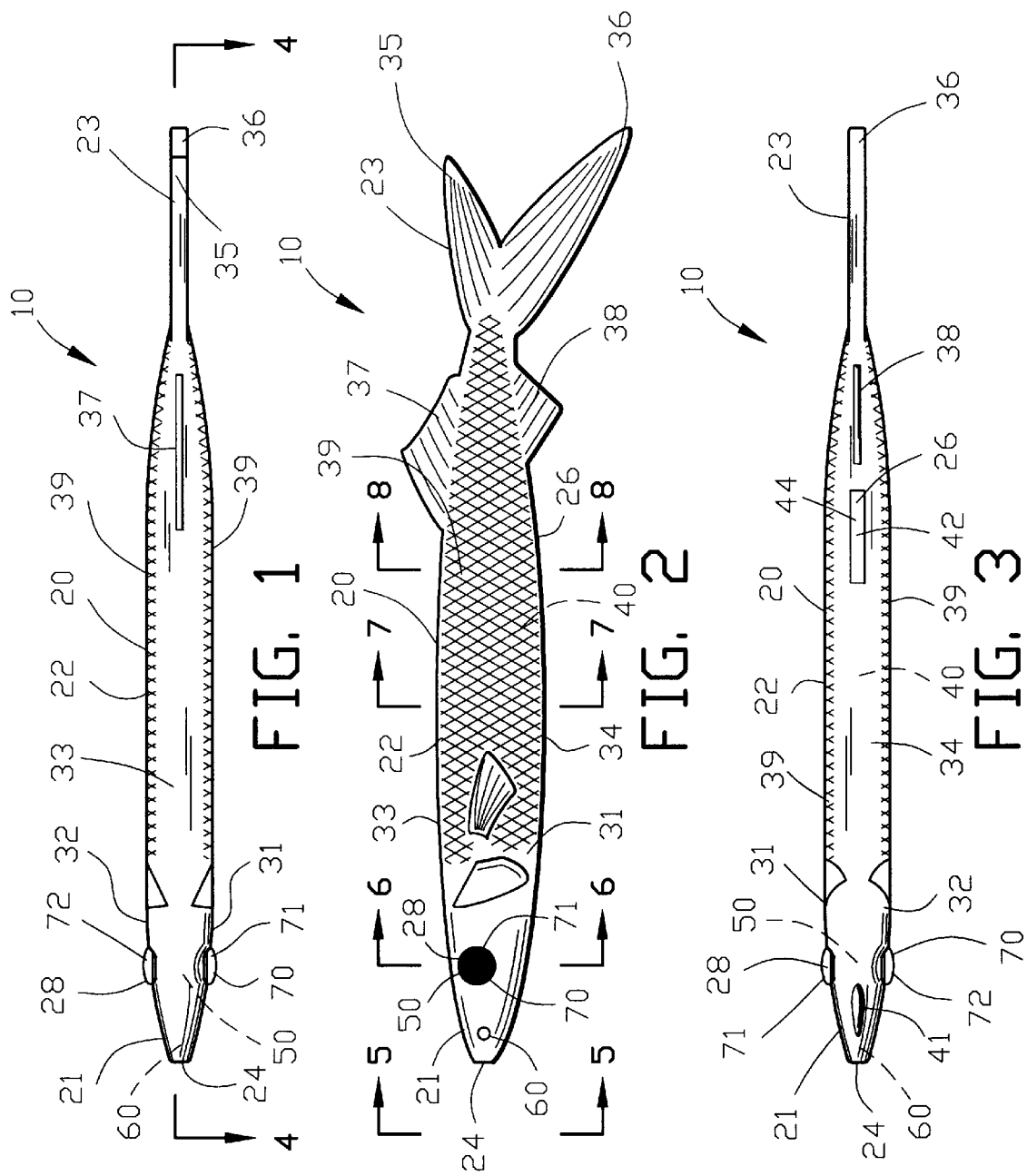

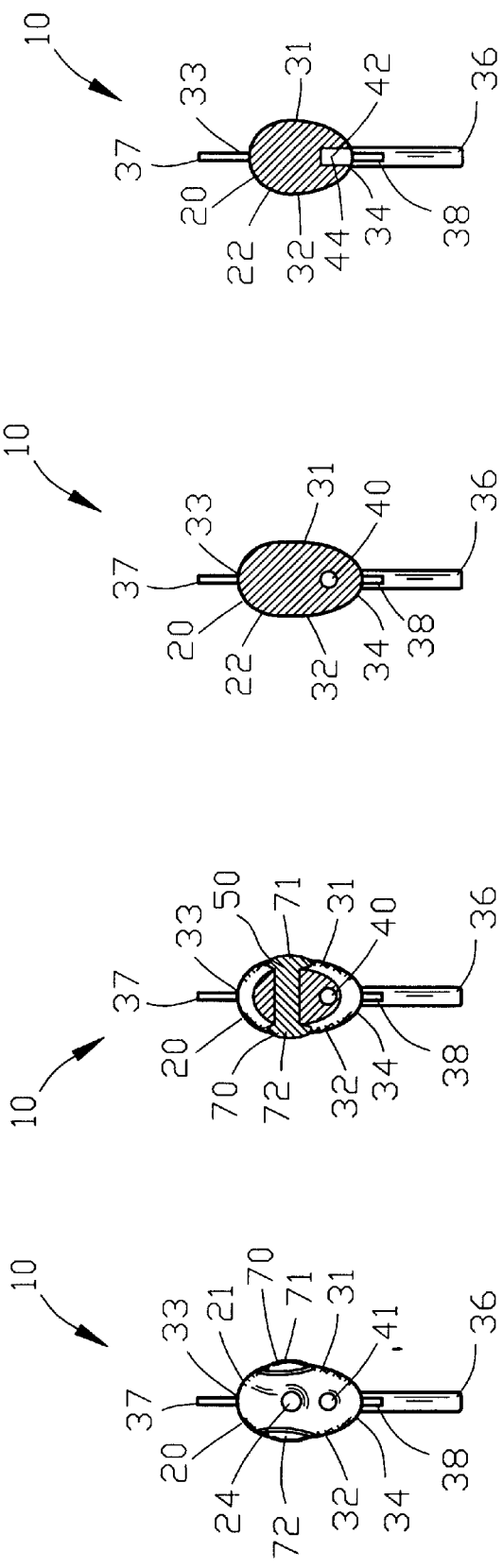

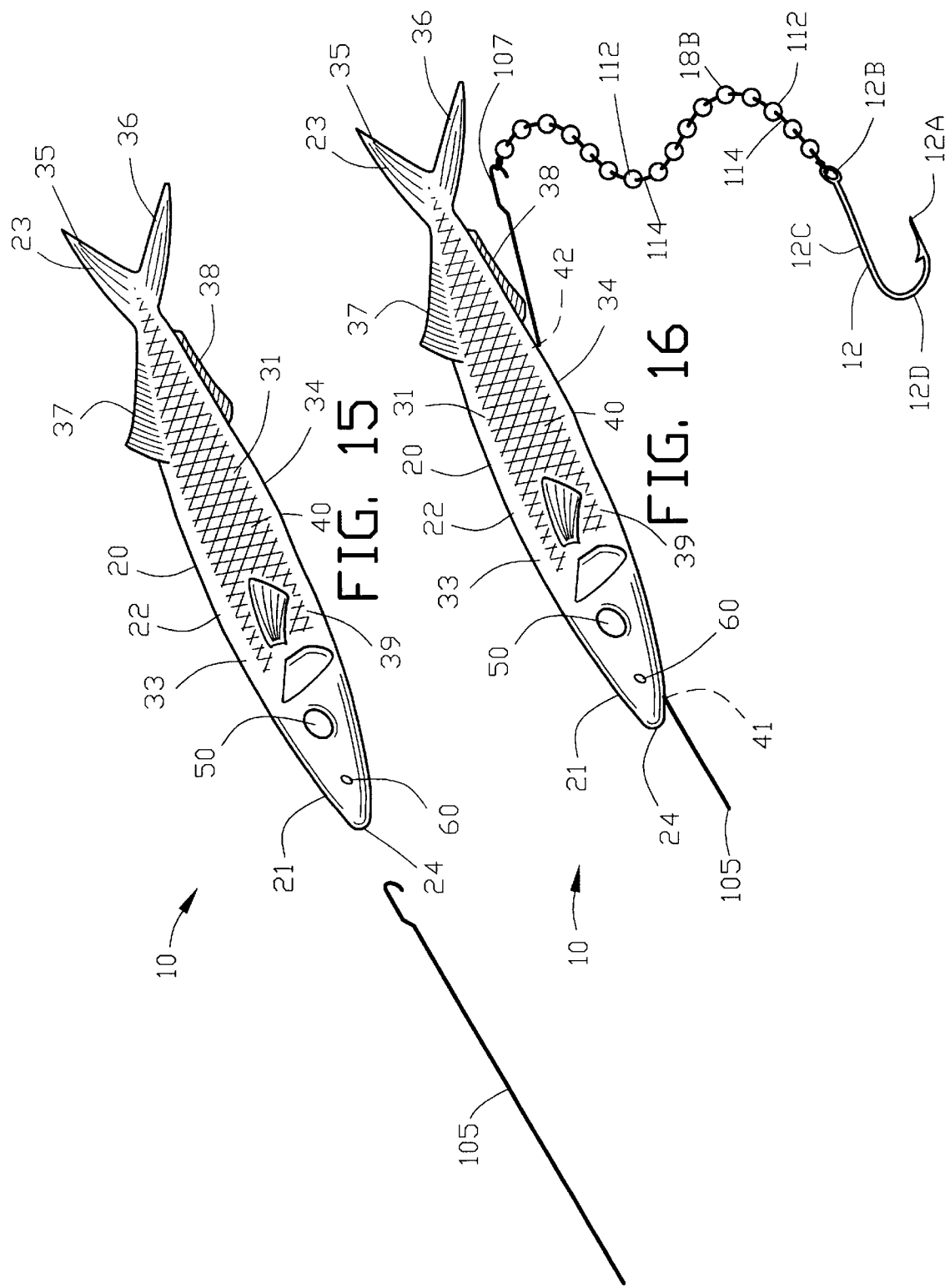

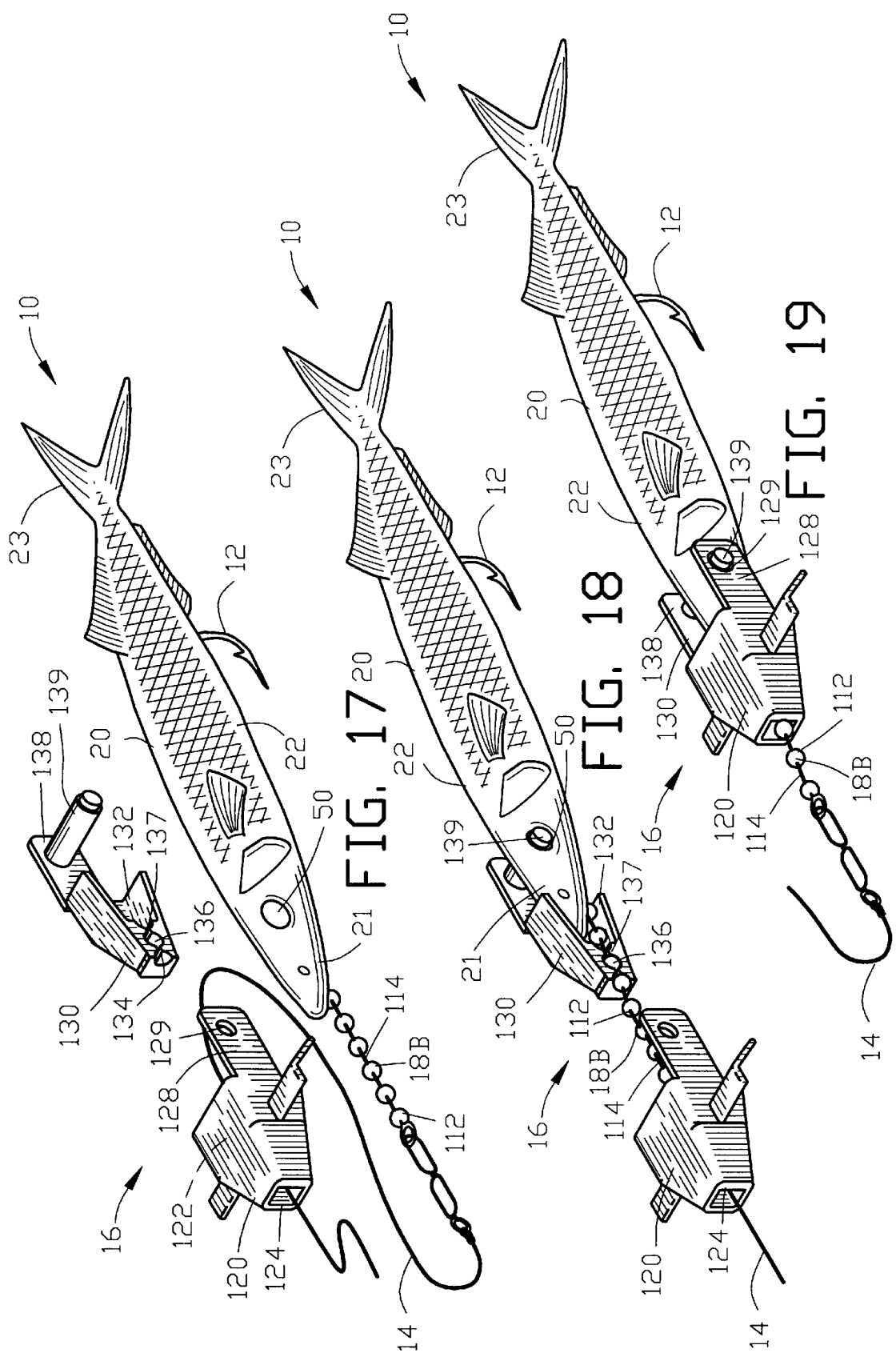

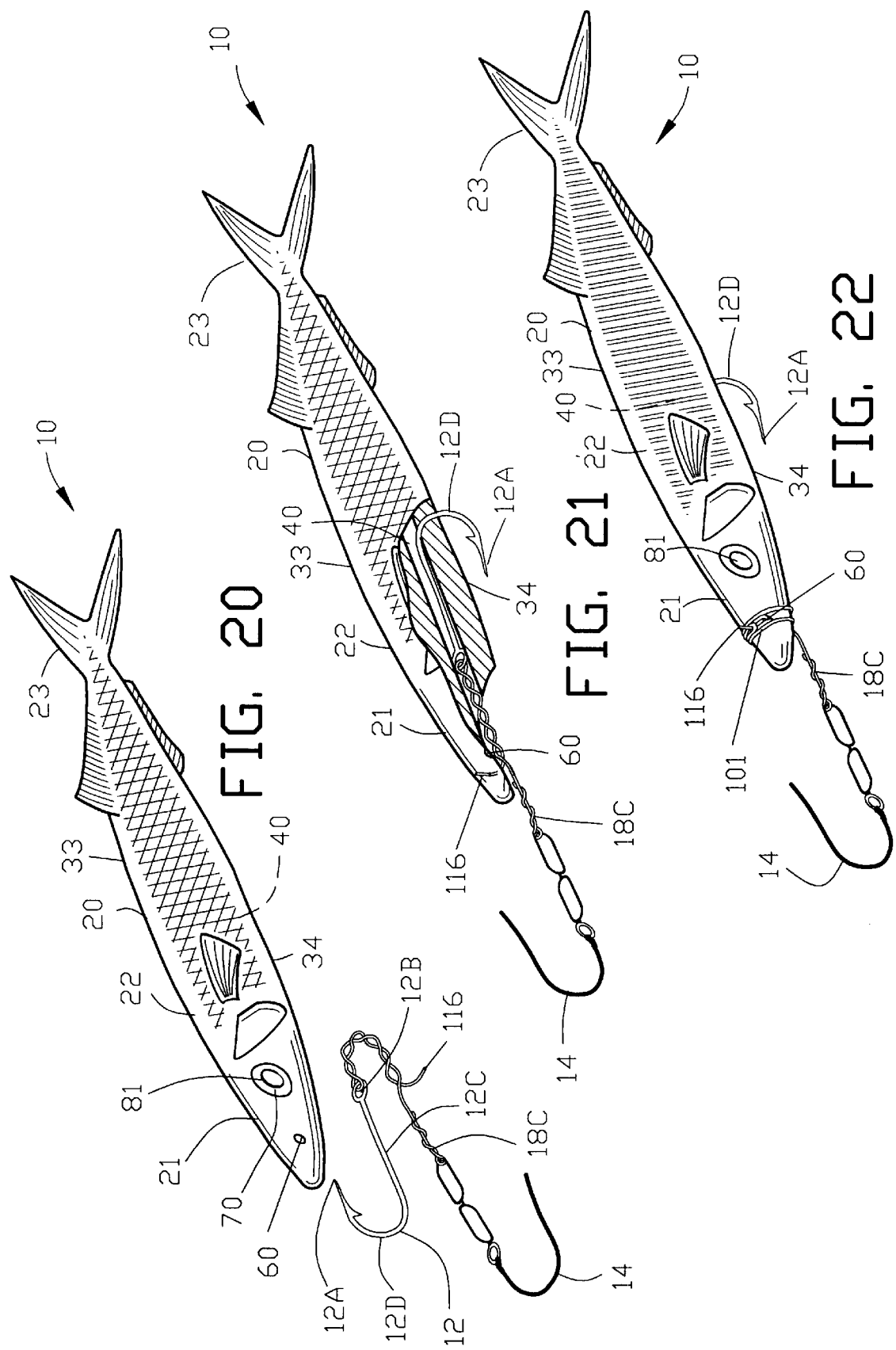

ARTIFICIAL BAIT FISH

CROSS-REFERENCE TO RELATED APPLICATIONS

This application claims benefit of U.S. Patent Provisional application Ser. No. 60/274,173 filed Mar. 8, 2001. All subject matter set forth in provisional application Ser. No. 60/274,173 is hereby incorporated by reference into the present application as if fully set forth herein.

BACKGROUND OF THE INVENTION

1. Field of the Invention

This invention relates to fishing and more particularly to an improved artificial bait fish for use with a fishing hook and/or an artificial fishing lure.

2. Description of the Related Art

Various types of bait fish have been used by fisherman in the prior art. In general, bait fish may be classified as natural bait fish or artificial bait fish. Both natural bait fish and artificial bait fish have been used with a fishing hook and/or a fishing lure. When a living natural bait fish is used with a fishing lure, the fishing lure enhances the motion, action, sound and/or appearance of the natural bait fish. In the event the natural bait fish is dead, the fishing lure provides the motion, action and/or sound to the natural bait fish.

When an artificial bait fish is used with a fishing lure, the fishing lure provides the total attraction for the artificial bait fish and simulates the motion, action, sound and/or appearance of a natural bait fish. The following U.S. Patents are representative of artificial bait fish known in the prior art.

U.S. Pat. No. 2,017,333 to Zuck discloses a lure with live bait impaling means by which the bait is retained on the lure to permit casting or trolling.

U.S. Pat. No. 2,196,376 to Anderson discloses a means which may be manually gripped for easily inserting an impaling member into the bait, such as a minnow or other small fish.

U.S. Pat. No. 2,848,836 to Dodd discloses a bait harness that is adapted to facilitate connection and disconnection of the bait to a harness.

U.S. Pat. No. 3,415,004 to Whalen discloses a live bait harness having a band embracing the body of the live bait comprising two one-piece wire mechanisms, one of which is fastened to a band and the other of which is a spreader mechanism for holding a pair of fishhooks spaced apart on opposite sides of the live bait.

U.S. Pat. No. 3,645,031 to Egles discloses a trolling rig for bait fishing having a substantially frustoconical-shaped cap to receive the head of the bait fish. A fish locking pin extends through the openings and the head of the fish for securing the fish to the cap.

U.S. Pat. No. 4,067,135 to Martin discloses a fishing lure adapted to hold live, dead and artificial bait and includes a cup having an open end and a closed end for holding a first portion of a bait therein. Anchors extend from the open end of the cup into a portion of the bait.

U.S. Pat. No. 4,133,132 to Ellis et al discloses a protector for covering the front face of a "plug-cut herring" to maintain the front face of the plug at a predetermined angle. The protector is a cap having a planar face and a cylindrical wall adapted to extend rearwardly along the sides of the herring when the inside surface of the cap member abuts the front face of the herring.

U.S. Pat. No. 4,233,771 to Robinson discloses a bait holder for holding minnow-type bait having a ring within which the head of the bait has a wedged fit and which is held in position by engagement of a pair of hooks at free ends of a pair of parallel arms extending aft from the ring.

U.S. Pat. No. 4,791,751 to Francklyn discloses an adjustable bait-receiving fishing lure for use in receiving baits. The bait-receiving lure includes a top section and bottom section that cooperatively engage the upper and lower forward portions of a bait.

U.S. Pat. No. 4,848,023 to Ryder et al discloses a fishing lure for use with dead bait fish including a cover having a cavity having project-ing barbs for insertion of the head of the bait fish. The cover can be opened to receive the head of the bait fish and can be closed to anchor the fish head within the articulated cover.

U.S. Pat. No. 4,932,154 to Andreetti discloses a trolling rig intended for use with ballyhoo. The trolling rig has a conical cap that resembles the head of a ballyhoo with a leader being attached to the leading edge of the cap. A second leader is attached to a rear lower edge of the conical cap and a hook is connected thereto.

In my prior U.S. Pat. Nos. 5,177,895 and 5,505,016 and 5,778,593, I disclosed improved fishing lures for attaching a bait to a fishing line. The improved fishing lures could be used with both natural bait fish as well as artificial bait fish.

Many fisherman used living ballyhoo bait or the like as a living natural bait fish with fishing lures. Other fisherman use frozen ballyhoo bait or the like as a dead natural bait fish with fishing lures. In some instances, some fishermen did not wish to use living or frozen ballyhoo bait due to personal preference, cost and/or availiabilty of the natural ballyhoo.

Therefore, it is a primary object of the present invention to provide an improved artificial bait fish that is adaptable to a variety of uses, modes of operation and applications.

Another object of this invention is to provide an improved artificial bait fish for fishermen that prefer to use an artificial bait fish instead of a natural bait fish or the like.

Another object of this invention is to provide an improved artificial bait fish that accurately simulates a live bait fish during use by a fisherman.

Another object of this invention is to provide an improved artificial bait fish that provides a natural swimming movement of the improved artificial bait through the water.

Another object of this invention is to provide an improved artificial bait fish that is specifically adapted for use with my improved fishing lures set forth in the above U.S. Pat. Nos. 5,177,895 and 5,505,016 and 5,778,593.

Another object of this invention is to provide an improved artificial bait fish that is adaptable for use with various types and arrangements of fishing lures of the prior art.

Another object of this invention is to provide an improved artificial bait fish that is adaptable for use with various types and arrangements of conventional fishing hooks and fishing leaders of the prior art.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to an improved artificial bait fish for use with a fishing hook attached to a fishing line. The improved artificial bait fish comprises a longitudinally extending fish body member formed in a replica of a fish. The fish body member comprises a head portion, a body portion and a tail portion. A bore extends longitudinally through the fish body member from the head portion toward the tail portion. The bore receives the fishing line therein for positioning the fishing hook relative to the tail portion of the fish body member.

In one embodiment of the invention, the fish body member is formed from a unitary piece of material such as a flexible polymeric material. Preferably, the flexible polymeric material is selected from the group consisting of thermo plastic elastimers.

The fishing hook comprises a shank portion and a hook portion. The bore extends longitudinally through the fish body member for at least partially receiving the shank portion of the fishing hook to position the hook portion of the fishing hook relative to the tail portion of the fish body member.

In another embodiment of the invention, the fish body member includes an aperture extending through the fish body member for mounting the fish body member to the fishing line. Preferably, the aperture extends through the fish body member in a direction substantially transverse to the longitudinally extending fish body member. In one embodiment of the invention, the aperture extends through the fish body member in proximity to an eye socket of the fish body member. In another embodiment of the invention, an orifice extends through the fish body member in proximity to a mouth of the fish body member. The orifice extends through the fish body member in a direction substantially transverse to the longitudinally extending fish body member.

The invention is also incorporated into an improved artificial bait fish for use with a fishing lure and a fishing hook attached to a fishing line. The fishing lure comprises a restraint for restraining the movement of the fishing line relative to the fishing lure. The fishing lure further comprises a locking pin for securing improved artificial bait fish to the fishing lure. The improved artificial bait fish comprises a longitudinally extending fish body member formed in a replica of a fish. The fish body member has a head portion, a body portion and a tail portion. A bore extends longitudinally through the fish body member from the head portion toward the tail portion. An aperture extends transversely through the fish body member in proximity to the head portion of the fish body member. The aperture receives the locking pin of the fishing lure for securing the fish body member to the fishing lure. The bore receives the fishing line therein for positioning the fishing hook relative to the tail portion of the fish body member. The restraint of the fishing lure restrains the movement of the fishing line relative to the fish body member.

Preferably, the restraint comprises an adjustable restraint for adjusting the position of the hook portion of the fishing hook relative to the tail portion of the fish body member. The fishing line may include a bead leader comprising a plurality of beads interconnected by a plurality of interconnecting wires.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a top view of the improved artificial bait fish of the present invention;

FIG. 2 is a side elevational view of the improved artificial bait fish of FIG. 1;

FIG. 3 is a bottom view of FIG. 2;

FIG. 4 is a sectional view along line 4—4 in FIG. 1;

FIG. 5 is a view along line 5—5 in FIG. 2;

FIG. 6 is a view along line 6—6 in FIG. 2;

FIG. 7 is a view along line 7—7 in FIG. 2;

FIG. 8 is a view along line 8—8 in FIG. 2;

FIG. 15 is a first step of securing the improved artificial bait fish of FIGS. 1–8 to a fishing lure illustrating the insertion of a retrieving catch through the improved artificial bait fish;

FIG. 16 is a second step of securing the improved artificial bait fish of FIGS. 1–8 to a fishing lure illustrating the coupling of the retrieving catch with a fishing line shown as a bead leader having a fishing hook;

FIG. 17 is a third step of securing the improved artificial bait fish of FIGS. 1–8 to a fishing lure illustrating the drawing of the bead leader through a bore within the improved artificial bait fish and the passing of the bead leader through a fishing lure;

FIG. 18 is a fourth step of securing the improved artificial bait fish of FIGS. 1–8 to a fishing lure illustrating the connection of the fishing lure with the improved artificial bait fish;

FIG. 19 is a fifth step of securing the improved artificial bait fish of FIGS. 1–8 to a fishing lure illustrating the assembly of the fishing lure for affixing of the fishing lure to the bead leader;

FIG. 20 is a first step of a second method of securing the improved artificial bait fish of FIGS. 1–8 to a fishing line illustrating the insertion of the fishing hook through a bore within the improved artificial bait fish;

FIG. 21 is a second step of the first method of securing the improved artificial bait fish of FIGS. 1–8 to a fishing line illustrating the positioning of the fishing hook relative to the improved artificial bait fish;

FIG. 22 is a third step of the first method of securing the improved artificial bait fish of FIGS. 1–8 to a fishing line illustrating the securing of the fishing line to the improved artificial bait fish;

Similar reference characters refer to similar parts throughout the several Figures of the drawings.

DETAILED DISCUSSION

Figure 10:
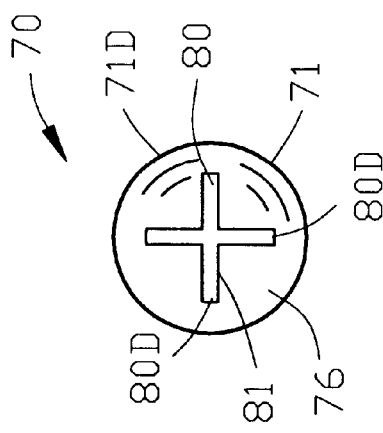
FIG. 10 is a view along line 10—10 in FIG. 9.

FIGS. 1–11 are various views of an improved artificial bait fish 10 of the present invention. The improved artificial bait fish 10 may be used with a fishing hook 12 attached to a fishing line 14 as shown in FIGS. 12–14. In the alternative, the improved artificial bait fish 10 may be used with a fishing lure 16 as shown in FIGS. 6–19.

The improved artificial bait fish 10 comprises a longitudinally extending fish body member 20 formed in a replica of a fish. In the preferred embodiment of the invention, the fish body member 20 is a replica of a ballyhoo or balao weighing between one-quarter pound and one-half pound. The ballyhoo bait fish is widely used in trolling for smaller predator fish as well as large game fish such as marlin, sailfish and the like.

The fish body member 20 comprising a head portion 21, a body portion 22 and a tail portion 23. The fish body member 20 includes a mouth 24 located within the head portion 21 of the fish body member 20 as well as an anus 26 located within the body portion 22 of the fish body member 20. The fish body member 20 has an eye 28 located within the head portion 21 of the fish body member 20 as will be described in greater detail hereinafter.

The fish body member 20 defines a first and a second side 31 and 32 and a top and a bottom 33 and 34. The fish body member 20 includes a top and a bottom tail fin 35 and 36 as well as a top and a bottom body fin 37 and 38. The fish body member 20 has simulated scales 39 on the first and second sides 31 and 32 of the fish body member 20.

Preferably, the fish body member 20 is formed from a flexible material. In this example, the fish body member 20 is formed from a one-piece flexible polymeric material selected from the group consisting of thermo plastic elastimers. Ideally, the fish body member 20 is formed from a unitary piece of highly plasticized vinyl. The fish body member 20 formed from a flexible material enables the improved artificial bait fish 10 to act in a manner similar to a natural bait fish.

As best shown in FIGS. 4–8, the fish body member 20 includes a bore 40 extending longitudinally through the fish body member 20 between a first and a second end 41 and 42. Preferably, the bore 40 extends longitudinally through the fish body member 20 from the head portion 21 toward the tail portion 23 of the fish body member 20. In this preferred example of the invention, the bore 40 extends through the fish body member 20 from a location in proximity to the mouth 24 of the fish body member 20 to a location in proximity to the anus 26 of the fish body member 20.

The second end 42 of the bore 40 includes an enlarged portion 44 for receiving the fishing hook 12 as will be described in greater detail hereinafter. The cross-section of the bore 40 is dimensioned for receiving the fishing line 12 and/or a portion of the fishing hook 14 for positioning the fishing hook 14 relative to the tail portion 23 of the fish body member 20.

The fish body member 20 includes an aperture 50 extending through the fish body member 20 in proximity to the eye 28 of the fish body member 20. In this example of the invention, the aperture 50 is coincident with the eye 28 located within the head portion 21 of the fish body member 20. The aperture 50 extends through the fish body member 20 in a direction substantially transverse to the longitudinally extending fish body member 20. Although the aperture 50 has been shown to be coincident with the eye 28 of the fish body member 20, it should be understood that the aperture 50 may be positioned at a different location within the fish body member 20. As will be described in greater detail hereinafter, the aperture 50 is used for mounting the fish body member 20 to the fishing line 12 and/or the fishing lure 16.

The fish body member 20 may include an optional orifice 60 extending through the fish body member 20 in proximity to the mouth 24 of the fish body member 20. The optional orifice 60 extends through the fish body member 20 in a direction substantially transverse to the longitudinally extending fish body member 20. Although the orifice 60 has been shown to be located in proximity to the mouth 24 of the fish body member 20, it should be understood that the orifice 60 may be positioned at a different location within the fish body member 20. As will be described in greater detail hereinafter, the orifice 60 may be used for mounting the fish body member 20 directly to the fishing line 14.

Figure 9:
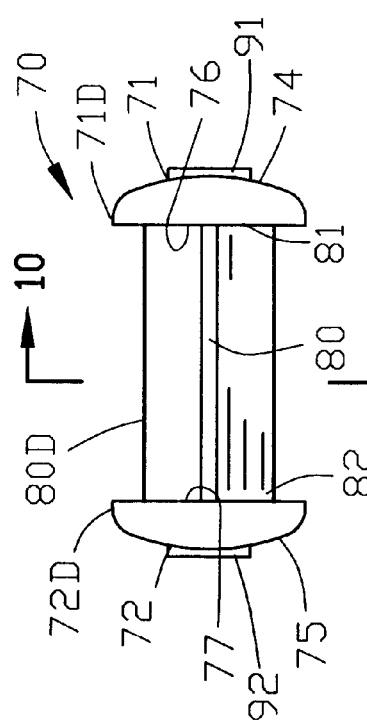
FIG. 9 is an enlarged front view on an eye socket aperture insert that has been removed from the improved artificial bait fish of FIGS. 1–8.

FIGS. 9–10 are enlarged views of an aperture insert 70 that has been removed from the improved artificial bait fish of FIGS. 1–8. The aperture insert 70 comprises a first and a second plate 71 and 72 interconnected by an intermediate coupling 80. The first and second plates 71 and 72 define exterior surfaces 74 and 75 and interior surfaces 76 and 77. Each of the first and second plates 71 and 72 are substantially circular disks defining outer diameters 71D and 72D. Preferably, the first and second plates 71 and 72 are made from a polymeric material.

The intermediate coupling 80 extends between a first end 81 and a second end 82. In this example of the invention, the intermediate coupling 80 is shown as a cross-beam simulating an outer diameter 80D. The outer diameters 71D and 72D of the first and second plates 71 and 72 are substantially greater than the outer diameter 80D of the intermediate coupling 80.

The first end 81 of the intermediate coupling 80 is connected to the first plate 71 whereas the second end 82 of the intermediate coupling 80 is connected to the second plate 72. The first and second ends 81 and 82 of the intermediate coupling 80 may be connected to the first and second plates 71 and 72 by suitable means such as adhesives, mechanical fastening, sonic welding or any other type of suitable means.

Preferably, the first and second plates 71 and 72 and the intermediate coupling 80 are formed as a unitary member.

Preferably, the first and second plates 71 and 72 include a first and a second eye replica 91 and 92 for simulating the eyes 28 of the artificial bait fish 10. The first and second eye replica 91 and 92 may be affixed to the first and second plates 71 and 72 by suitable means such as adhesives, sonic welding or any other type of suitable means. In the alternative, the first and second eye replica 91 and 92 may be painted onto the first and second plates 71 and 72. In still a further alternative, the first and second eye replica 91 and 92 may be hot stamped onto the first and second plates 71 and 72.

FIGS. 1–6 illustrate the aperture insert 70 inserted within the aperture 50. The first and second eye replica 91 and 92 simulate the eyes 28 of the artificial bait fish 10 when the aperture insert 70 is inserted within the aperture 50 as shown in FIGS. 1–3.

When the aperture insert 70 is inserted within the aperture 50, the interior surfaces 76 and 77 of the first and second plates 71 and 72 engage with the first and second sides 31 and 32 of the fish body member 20. Preferably, the intermediate coupling 80 has a length slightly less that the width of the fish body member 20 at the aperture 50. The relationship between the length of the intermediate coupling 80 and the width of the fish body member 20 enables the interior surfaces 76 and 77 of the first and second plates 71 and 72 to slightly compress the first and second sides 31 and 32 of the fish body member 20 to resiliently engage with the fish body member 20. The resilient engagement of the first and second plates 71 and 72 with the fish body member 20 maintains the position of the aperture insert 70 relative to the fish body member 20.

Figure 11:
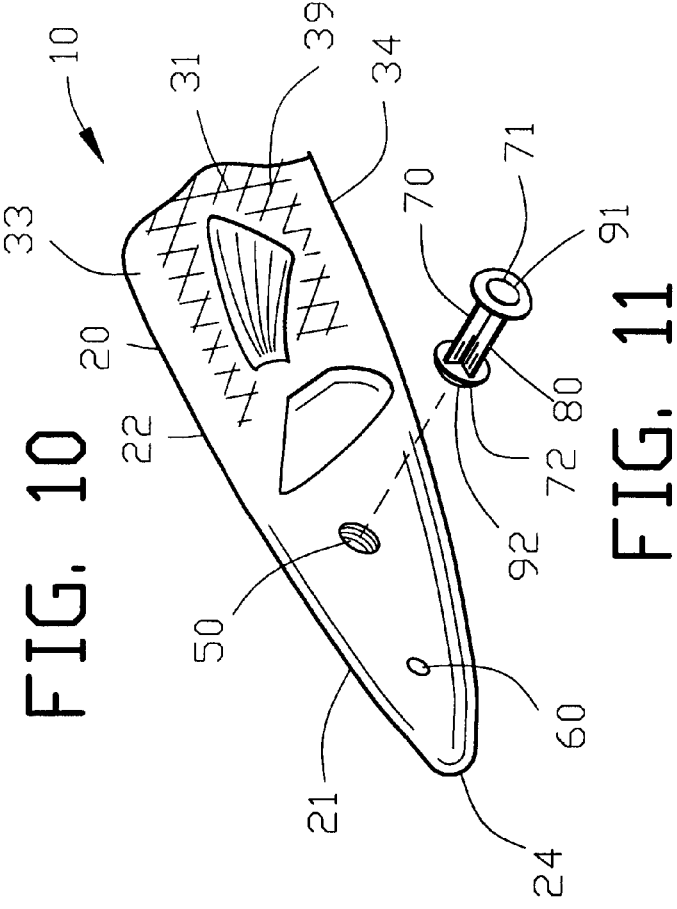
FIG. 11 is an isometric view of a portion of the improved artificial bait fish of FIGS. 1–8 with the eye socket aperture insert separated therefrom.
Figures 12, 13, 14:
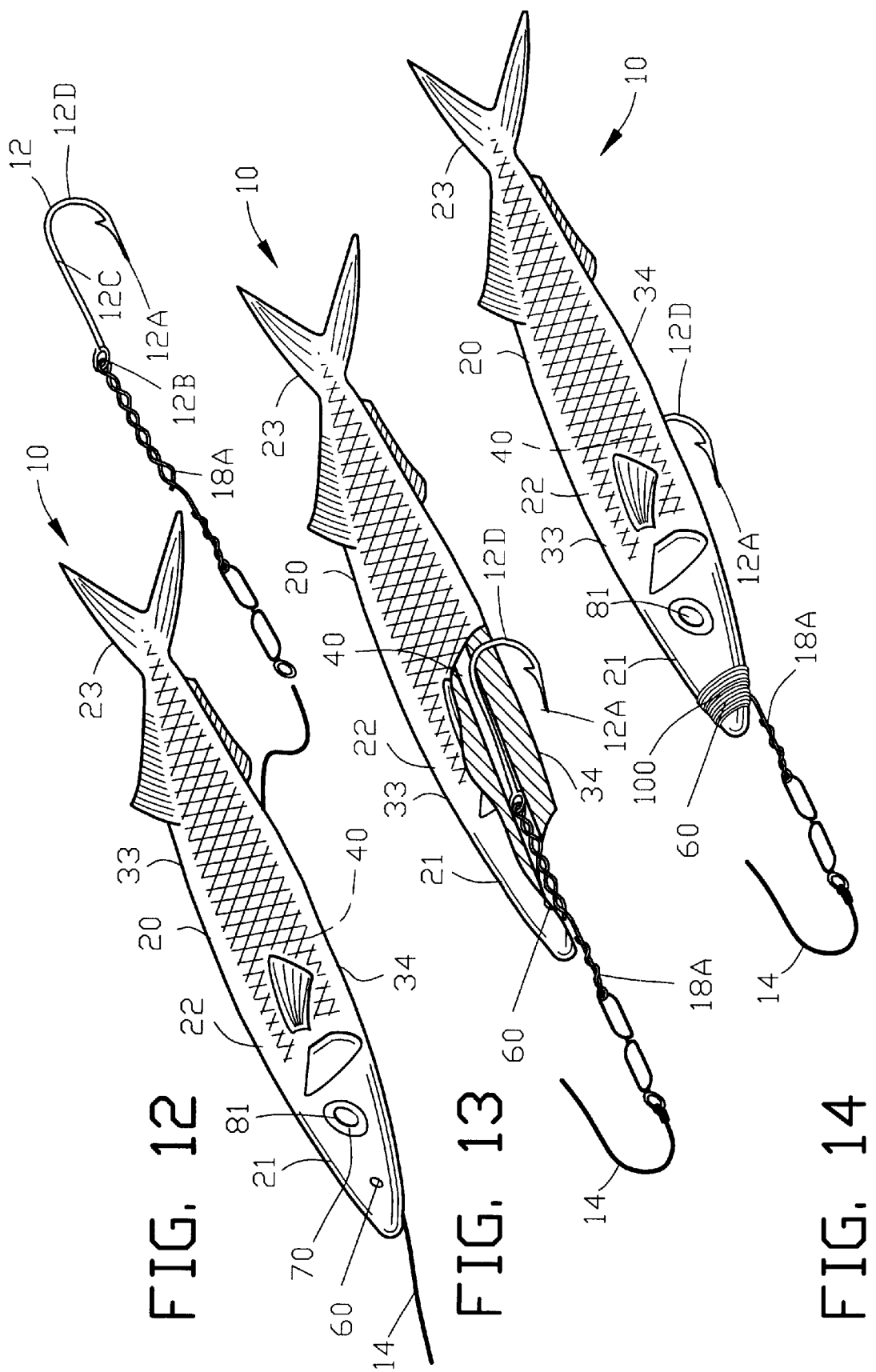
FIG. 12 is a first step of a first method of securing the improved artificial bait fish of FIGS. 1–8 to a fishing line illustrating the insertion of the fishing line through a bore within the improved artificial bait fish.
FIG. 13 is a second step of the first method of securing the improved artificial bait fish of FIGS. 1–8 to a fishing line illustrating the positioning of the fishing hook relative to the improved artificial bait fish.
FIG. 14 is a third step of the first method of securing the improved artificial bait fish of FIGS. 1–8 to a fishing line illustrating the securing of the fishing line to an aperture in the improved artificial bait fish.

FIG. 11 is an isometric view of a portion of the improved artificial bait fish 10 of FIGS. 1–8 with the aperture insert 70 being removed from the fish body member 20. The resiliency of the fish body member 20 enables the either of the first and second plates 71 and 72 of the aperture insert to pass through the aperture 50 for removing the aperture insert 70.

FIGS. 12–14 illustrate the improved artificial bait fish 10 of the present invention in a first method of operation wherein the improved artificial bait fish 10 is secured to a fishing line 14. When the improved artificial baitfish 10 is used only with the fishing line 14, the aperture insert 70 may remain within the aperture 50.

FIGS. 15–19 illustrate the improved artificial bait fish 10 of the present invention in a second method of operation wherein the improved artificial bait fish 10 is secured to the fishing lure 16. When the improved artificial bait fish 10 is used with the fishing lure 16, the aperture insert 70 is removed from the aperture 50.

FIGS. 12–14 illustrate the steps of securing the improved artificial bait fish 10 of FIGS. 1–8 to the fishing line 14. The fishing hook 12 comprises a point 12A and an eye 12B with a shank portion 12C and a hook portion 12D. The eye 12B of the fishing hook 12 may be directly connected to the fishing line 14 in a conventional fashion or may be connected to the fishing line 12 through a leader 18A. In this example, the fishing hook 12 is affixed to the fishing line 14 through a conventional wire leader 18A.

FIG. 12 illustrates a first step in the process of securing the improved artificial bait fish 10 to the fishing line 14. The fishing line 14 is inserted through the bore 40 of the improved artificial bait fish 10. The fishing line 14 is inserted into the first end 41 of the bore 40 of the improved artificial bait fish 10 to extend from the second end 42. After the fishing line 14 has been threaded through the bore 40 of the improved artificial bait fish 10, the fishing line 14 is secured to the leader 18A.

FIG. 13 illustrates the second step in the process of securing the improved artificial bait fish 10 to the fishing line 14. The fishing line 14 is used to pull the leader 18A and the hook 12 from the second end 42 toward the first end 41 of the bore 40. The fishing line 14 is pulled to position the point 12A of the fishing hook 12 in the desired location relative to the improved artificial bait fish 10.

In the alternative, the fishing hook 12 may be rotated one hundred and eighty degrees in FIG. 13 such that the point 12A of the fishing hook 12 is embedded within the improved artificial bait fish 10. When the point 12A of the fishing hook 12 is embedded within the improved artificial bait fish 10, the improved artificial bait fish 10 is substantially weedless.

FIG. 14 illustrates the third step in the process of securing the improved artificial bait fish 10 to the fishing line 14. A securing wire 100 secures the improved artificial bait fish 10 to the leader 18A. In this example, the securing wire 100 extends through the orifices 70 and is simultaneously wrapped around the improved artificial bait fish 10 and the leader 18A for securing the improved artificial bait fish 10 to the leader 18A.

FIGS. 15–19 illustrate the steps of securing the improved artificial bait fish 10 of FIGS. 1–8 to the fishing lure 16. The fishing lure 16 illustrated in FIGS. 17–19 may be representative of the fishing lure disclosed in my U.S. Pat. Nos. 5,177,895 and 5,505,016 and 5,778,593 which are incorporated by reference into the present disclosure as if fully set forth herein. Although the improved artificial bait fish 10 is shown in use with the fishing lure 16 disclosed in my U.S. Pat. Nos. 5,177,895 and 5,505,016 and 5,778,593, it should be understood that the improved artificial bait fish 10 of the present invention may be used with various other types of fishing lures.

FIG. 15 illustrates the first step of securing the improved artificial bait fish 10 of FIGS. 1–8 to the fishing lure 16. The fishing line 14 may be inserted into the first end 41 to exit from the second end 42 of the bore 40 in a manner similar to FIG. 12. In the alternative, a retrieving catch 105 may be used to pull a leader 18B from the second end 42 to the first end 41 of the bore 40.

FIG. 16 is a second step of securing the improved artificial bait fish 10 to the fishing lure 16. The retrieving catch 105 is inserted into the first end 41 to exit from the second end 42 of the bore 40 of the improved artificial bait fish 10. The retrieving catch 105 is coupled to the leader 18B. The leader 18B is shown as a beaded leader having a series of beads 112 interconnected by a series of connecting wires 114.

FIG. 17 is a third step of securing the improved artificial bait fish 10 to the fishing lure 16. The retrieving catch 105 has pulled the leader 18B from the second end 42 to exit from the first end 41 of the bore 40 to position the point 12A of the fishing hook 12 in the desired location relative to the fish body member 20. The fishing line 14 is threaded through the fishing lure 16 and is connected to the leader 18B. In the alternative, the fishing hook 12 may be rotated one hundred and eighty degrees making the improved artificial bait fish 10 substantially weedless.

FIG. 17 illustrates a disassembled view of the fishing lure 16 comprising a lure head 120 and a lure insert 130.

The lure head 120 defines a head cavity 122 with a front aperture 124 communicating with the head cavity 122. The lure head 120 includes an extending head panel 128 having a locking aperture 129 defined therein.

The lure insert 130 includes an insert relief 132 with an insert slot 134 extending from the front of the lure insert 130 to the insert relief 132. A plurality of depressions 136 are spaced along the insert slot 134 for defining a plurality of interposed separating wall 137. The plurality of depressions 136 and the plurality of separating walls 137 comprise a restraint for restraining the movement of the leader 18B relative to the improved fishing lure 16. The lure insert 130 includes an extending insert panel 138 having a locking pin 139 extending therefrom.

FIG. 18 is a fourth step of securing the improved artificial bait fish 10 to the fishing lure 16. The fishing lure 16 is shown being connected to the improved artificial bait fish 10 and to the leader 18B. The locking pin 139 is passed through the aperture 50 of the improved artificial bait fish 10 for providing an effective attachment of the fishing lure 16 to the improved bait fish 10.

Selected beads 112 of the bead leader 18B are inserted into the depressions 136 with the interconnecting wires 114 extend through the slot 134 in the separating walls 137 to attach the bead leader 18B relative to the lure insert 130. The depressions 136 and separating walls 137 insure that the position of the bead leader 18B is fixed relative to the lure insert 130. In addition, the proper insertion of beads 112 into the depressions 136 enables the proper positioning of the fishing hook 12 relative to the lure insert 130 and relative to the improved bait fish 10.

FIG. 19 is a fifth step of securing the improved artificial bait fish 10 to the fishing lure 16. The lure insert 130 is inserted into the head cavity 122 of the lure head 120 for forming the fishing lure 16. When the lure insert 130 is inserted within the head cavity 122 of the lure head 120, the locking pin 139 extending from the second panel 138 is received with the locking aperture 129 within the first panel 128 of the lure head 120. The improved artificial bait fish 10 is positioned between the first panel 129 and the second panel 139 of the lure head 120 and the lure insert 130.

FIGS. 20–22 illustrate the improved artificial bait fish 10 of the present invention in a third method of operation wherein the improved artificial bait fish 10 is secured to a fishing line 14. When the improved artificial bait fish 10 is used only with the fishing line 14, the aperture insert 70 may remain within the aperture 50.

FIG. 20 is a first step of a second method of securing the improved artificial bait fish 10 of FIGS. 1–8 to the fishing line 14 illustrating the insertion of the fishing hook 12 through the first end 41 of the bore 40 within the improved artificial bait fish 10. The eye 12B of the fishing hook 12 may be directly connected to the fishing line 14 in a conventional fashion or may be connected to the fishing line 12 through a leader 18C as shown. In this embodiment, the leader 18C has an extending leader end 116.

The point 12A of the fishing hook 12 is inserted through the first end 41 of the bore 40 of the improved artificial bait fish 10. Concomitantly therewith, the fish body member 20 is bent such that the bore 40 of the improved artificial bait fish 10 follows the curve of the hook portion 12D of the fishing hook 12. The flexibility of the fish body member 20 enables the artificial bait fish 10 to be bent to follow the curve of the hook portion 12D of the fishing hook 12.

FIG. 21 is a second step of the second method of securing the improved artificial bait fish 10 of FIGS. 1–8 to the fishing line 14 illustrating the positioning of the fishing hook 12 relative to the improved artificial bait fish 10. The point 12A of the fishing hook 12 is shown piercing through the fish body member 20 between the bore 40 and the bottom 34 of the fish body member 20. The fishing hook 12 may pierce through the fish body member 20 anywhere along the bore 40 or may extend from the second end 42 of the bore 40.

The extending leader end 116 of the leader 18C is shown piercing through the fish body member 20 between the bore 40 and the top 33 of the fish body member 20. The fishing hook 12 may pierce through the fish body member 20 anywhere along the bore 40 in accordance with the position of the fishing hook 12 within the bore 40.

FIG. 22 is a third step of the second method of securing the improved artificial bait fish 10 of FIGS. 1–8 to a fishing line 14 illustrating the securing of the fishing line to the improved artificial bait fish. 10. An elastic fastener 101 secures the improved artificial bait fish 10 to the leader 18C. In this example, the elastic fastener 101 is shown as a rubber band 101 extending through the orifices 70 and simultaneously wrapped around the improved artificial bait fish 10 and the leader 18C for securing the improved artificial bait fish 10 to the leader 18C. An end portion of the rubber band 101 is resiliently anchored on the extending leader end 116 of the leader 18C.

Figure 23:
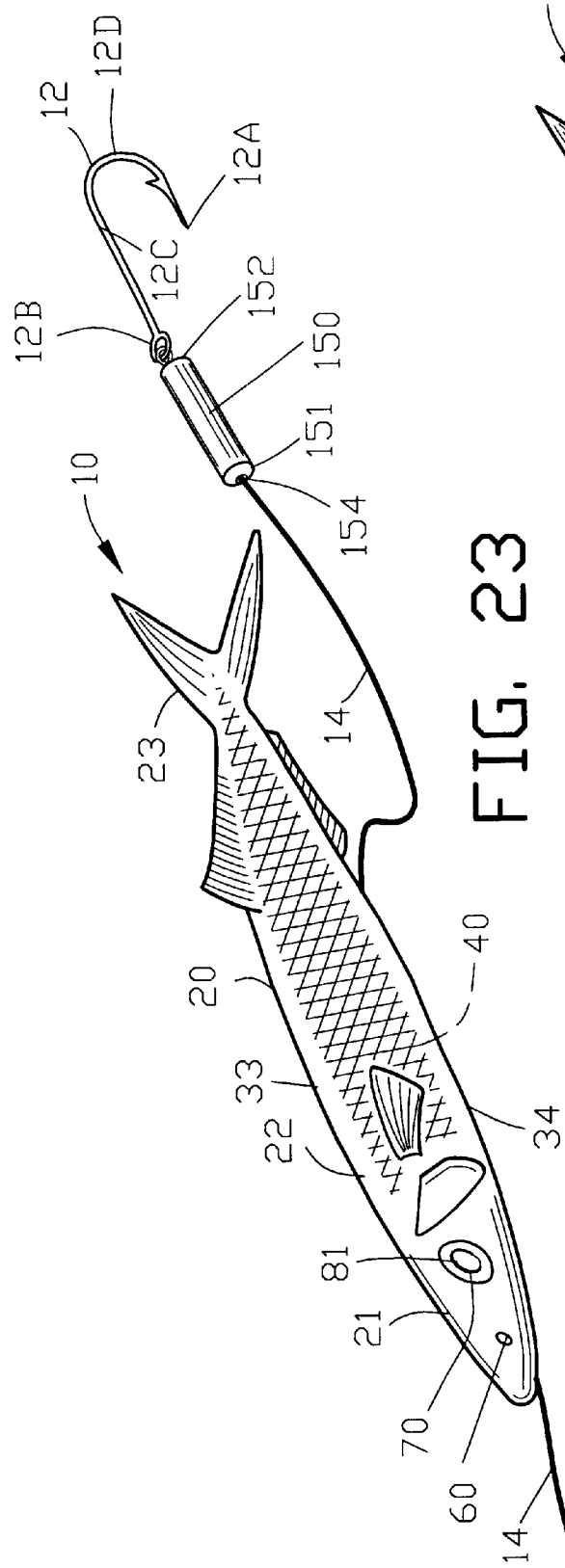
FIG. 23 is a first step of a method of securing the improved artificial bait fish of FIGS. 1–8 to a fishing line and a sinker illustrating the insertion of the fishing hook through a bore within the improved artificial bait fish.
Figure 24:
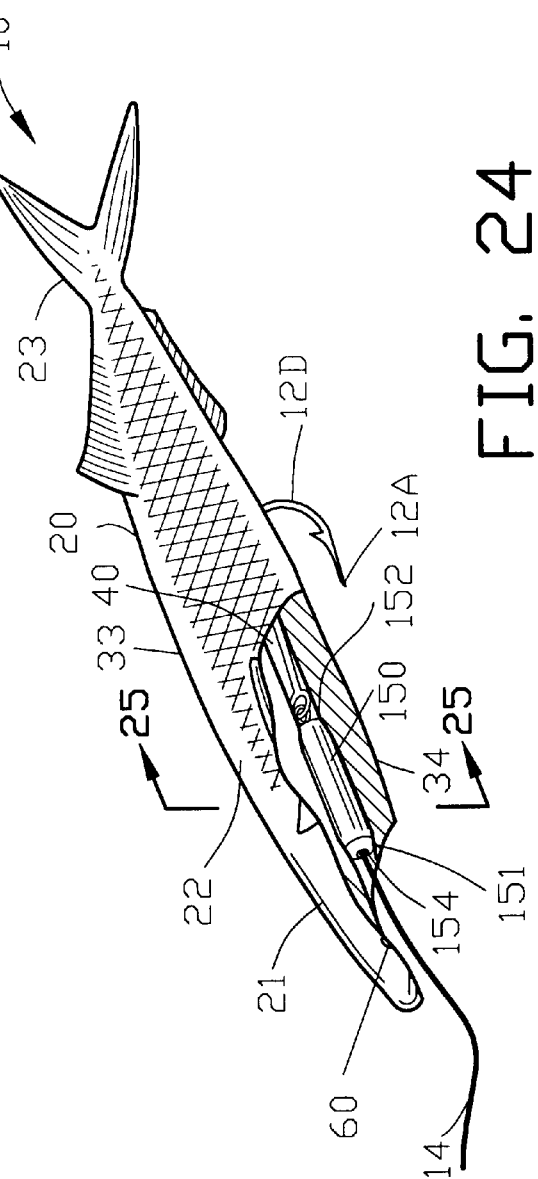
FIG. 24 is a second step of the method of securing the improved artificial bait fish of FIGS. 1–8 to a fishing line and the sinker illustrating the positioning of the fishing hook and the sinker relative to the improved artificial bait fish.
Figure 25:
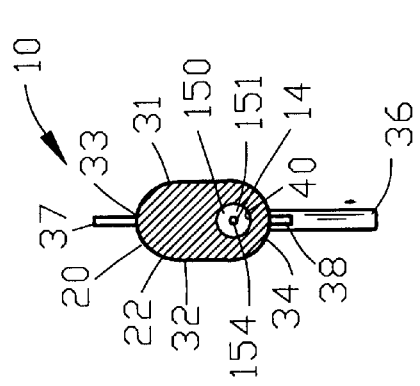
FIG. 25 is a sectional view along line 25—25 in FIG. 24.

FIGS. 23–25 illustrate the improved artificial bait fish 10 of the present invention in a fourth method of operation wherein the improved artificial bait fish 10 is secured to a fishing line 14 and a sinker 150. When the improved artificial bait fish 10 is used only with the fishing line 14 and a sinker 150, the aperture insert 70 may remain within the aperture 50.

FIG. 23 is a first step of the third method of securing the improved artificial bait fish 10 of FIGS. 1–8 to the fishing line 14. The fishing line 14 is inserted into the first end 41 of the bore 40 of the improved artificial bait fish 10 to extend from the second end 42. After the fishing line 14 has been threaded through the bore 40 of the improved artificial bait fish 10, the fishing line 14 is secured to the sinker 150 and the hook 12.

The sinker 150 is shown as a substantially cylindrical sinker extending between a first end and a second end 152. The sinker 150 defines an axial hole 154 extending from the first end 151 to the second end 152 of the sinker 150. The axial hole 154 is slidably received the fishing line 14 therethrough. The fishing line 14 is threaded through the axial hole 154 and is secured to the eye 12B of the fishing hook 12.

FIG. 24 is a second step of the third method of securing the improved artificial bait fish 10 of FIGS. 1–8 to the fishing line 14 and the sinker 150 illustrating the positioning of the fishing hook 12 and the sinker 150 relative to the improved artificial bait fish 10. The fishing line 14 is used to pull the hook 12 and the sinker 150 from the second end 42 toward the first end 41 of the bore 40. The fishing line 14 is pulled to position the point 12A of the fishing hook 12 in the desired location relative to the improved artificial bait fish 10.

FIG. 25 is a sectional view along line 25—25 in FIG. 24 illustrating the radial outward expansion of the bore 40 and the outward expansion of the fish body member 20 as the sinker 150 is pulled into the bore 40. The bore 40 returns to the non-expanded size as shown in FIG. 7 outward from the first and second ends 151 and 152 of the sinker 150 to entrap the sinker within the bore 40 of the fish body member 20. The flexibility of the fish body member 20 resiliently retains the sinker 150 within the bore 40.

The present invention provides an improved artificial bait fish for attaching to a conventional fishing hook and/or fishing leader of the prior art. The improved artificial bait fish is suitable for attaching to fishing lures set forth in the my aforementioned U.S. Patents as well as fishing lures of the prior art. The improved artificial bait fish that permits the rapid addition of the improved artificial bait or the rapid removal of improved artificial bait from the fishing line and/or fishing lure.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved artificial bait fish for use with a fishing hook attached to a fishing line, comprising:
   a fish body member formed of a flexible polymeric material in a replica of a fish;
   said fish body member extending longitudinally along a head portion, a body portion and a tail portion and defined by a top and a bottom surface and opposed side surfaces;
   a linear bore extending longitudinally through said fish body member between a first and a second end;
   said first end of said bore being located in proximity to said head portion of said fish body member;
   said second end of said bore being located within the fish body member adjacent to an anus of said fish body member;
   an enlarged opening extending into said fish body member in proximity to said anus of said fish body member and communicating with said second end of said bore;
   said bore having a cross-section dimensioned for receiving the fishing line and a shank portion of the fishing hook therein for positioning the fishing hook relative to said tail portion of said fish body member; and
   said enlarged opening being enlarged relative to said bore for receiving at least a portion of a hook portion of the fishing hook.

2. An improved artificial bait fish as set forth in claim 1, wherein said flexible polymeric material is selected from the group consisting of thermo plastic elastimers.

3. An improved artificial bait fish as set forth in claim 1, wherein said fish body member including said head portion, said body portion and said tail portion are formed of a unitary piece of said flexible polymeric material.

4. An improved artificial bait fish as set forth in claim 1, wherein said enlarged opening is enlarged relative to said bore in a dimension along said longitudinal dimension of said fish body member.

5. An improved artificial bait fish as set forth in claim 1, wherein said enlarged opening is enlarged relative to said bore in a dimension along transverse to said longitudinal dimension of said fish body member.

6. An improved artificial bait fish as set forth in claim 1 wherein said enlarged opening is commensurate in size to said bore in a dimension between said opposed side surfaces of said fish body member.

7. An improved artificial bait fish as set forth in claim 1, wherein said fish body member includes an aperture extending through said fish body member for mounting said fish body member to the fishing line.

8. An improved artificial bait fish as set forth in claim 1, wherein said fish body member includes an aperture extending through said fish body member for mounting said fish body member to the fishing line; and
   said aperture extending through said fish body member in a direction substantially transverse to said longitudinally extending fish body member.

9. An improved artificial bait fish as set forth in claim 1, wherein said fish body member includes an aperture extending through said fish body member for mounting said fish body member to the fishing line; and
   said aperture extending through said fish body member in a direction substantially transverse to said longitudinally extending fish body member in proximity to an eye socket of the fish body member.

10. An improved artificial bait fish as set forth in claim 1, wherein said fish body member includes an orifice extending through said fish body member for mounting said fish body member to the fishing line; and
    said orifice extending through said fish body member in a direction substantially transverse to said longitudinally extending fish body member in proximity to a mouth of the fish body member.

11. An improved artificial bait fish, comprising:
    a fish body member formed in a replica of a fish;
    said fish body member extending longitudinally along a head portion, a body portion and a tail portion and defined by a top and a bottom surface and opposed side surfaces;
    said head portion of said fish body member comprising a resilient material;
    an aperture extending through said head portion of said fish body member in a direction substantially transverse to said longitudinally extending fish body member;
    said aperture extending through said fish body member in proximity to a location of an eye of the replica of a fish;
    an aperture insert comprises a first and a second plate interconnected by an intermediate coupling;
    each of said first and second plates defining an exterior surface and an interior surface;
    a first and a second eye replica located on said exterior surfaces of said first and second plates for simulating the eyes of the artificial bait fish; and
    one of said first and second plates being insertable through said aperture upon resilient expansion of said fish body member for inserting said aperture insert into said aperture with said interior surfaces of said first and second plates to resiliently engaging with said first and second side of said fish body member for removably affixing said aperture insert within said aperture.

12. An improved artificial bait fish as set forth in claim 11, wherein said flexible polymeric material is selected from the group consisting of thermo plastic elastimers.

13. An improved artificial bait fish as set forth in claim 11, wherein said fish body member including said head portion, said body portion and said tail portion are formed of a unitary piece of said flexible polymeric material.

14. An improved artificial bait fish as set forth in claim 11, wherein said said first and second plates and said intermediate coupling are formed as a unitary member.

15. An improved artificial bait fish as set forth in claim 11, wherein said intermediate coupling defines an outer diameter extending between a first and a second end;
    said outer diameter of said intermediate coupling being commensurate in size with a diameter of said aperture; and
    said outer diameters of the first and second plates being substantially greater than said outer diameter of said intermediate coupling.

16. An improved artificial bait fish as set forth in claim 11, wherein each of the first and second plates are substantially circular disks defining a first and a second outer diameter.

17. An improved artificial bait fish as set forth in claim 11, wherein one of said first and second plates is removable from said aperture upon resilient expansion of said fish body member for removing said aperture insert from said fish body member for enabling said aperture to be used for mounting the fish body member to a fishing line or a fishing lure.

18. An improved artificial bait fish as set forth in claim 11, wherein said intermediate coupling has a length for positioning said interior surfaces of said first and second plates a distance less than a distance between said first and second sides of said fish body member for enabling said interior surfaces of said first and second plates to compress said first and second sides of said fish body member to resiliently engage with said fish body member to maintain said aperture insert within said fish body member.

19. An improved artificial bait fish, comprising:
- a fish body member formed of a unitary flexible polymeric material in a replica of a fish;
- said fish body member extending longitudinally along a head portion, a body portion and a tail portion and defined by a top and a bottom surface and opposed side surfaces;
- an aperture extending through the fish body member in a direction substantially transverse to the longitudinally extending fish body member;
- said aperture extending through said fish body member in proximity to a location of an eye of the replica of a fish;
- an aperture insert comprises a first and a second plate interconnected by an intermediate coupling;
- each of said first and second plates defining an exterior surface and an interior surface;
- a first and a second eye replica located on said exterior surfaces of said first and second plates for simulating the eyes of the artificial bait fish;
- one of said first and second plates being insertable through said aperture upon resilient expansion of said fish body member for inserting said aperture insert into said aperture with said interior surfaces of said first and second plates to resiliently engaging with said first and second side of said fish body member for removably affixing said aperture insert within said aperture;
- said intermediate coupling having a length for positioning said interior surfaces of said first and second plates a distance less than a distance between said first and second sides of said fish body member for enabling said interior surfaces of said first and second plates to compress said first and second sides of said fish body member to resiliently engage with said fish body member to maintain said aperture insert within said fish body member; and
- one of said first and second plates being removable from said aperture upon resilient expansion of said fish body member for removing said aperture insert from said fish body member for enabling said aperture to be used for mounting the fish body member to a fishing line or a fishing lure.

* * * * *